Oct. 20, 1942.　　　W. C. SKAREEN　　　2,299,508
MECHANISM CONTROL
Filed Sept. 7, 1940　　　2 Sheets-Sheet 1

INVENTOR
Willard C. Skareen
BY
Braselton, Whitcomb Davies
ATTORNEY

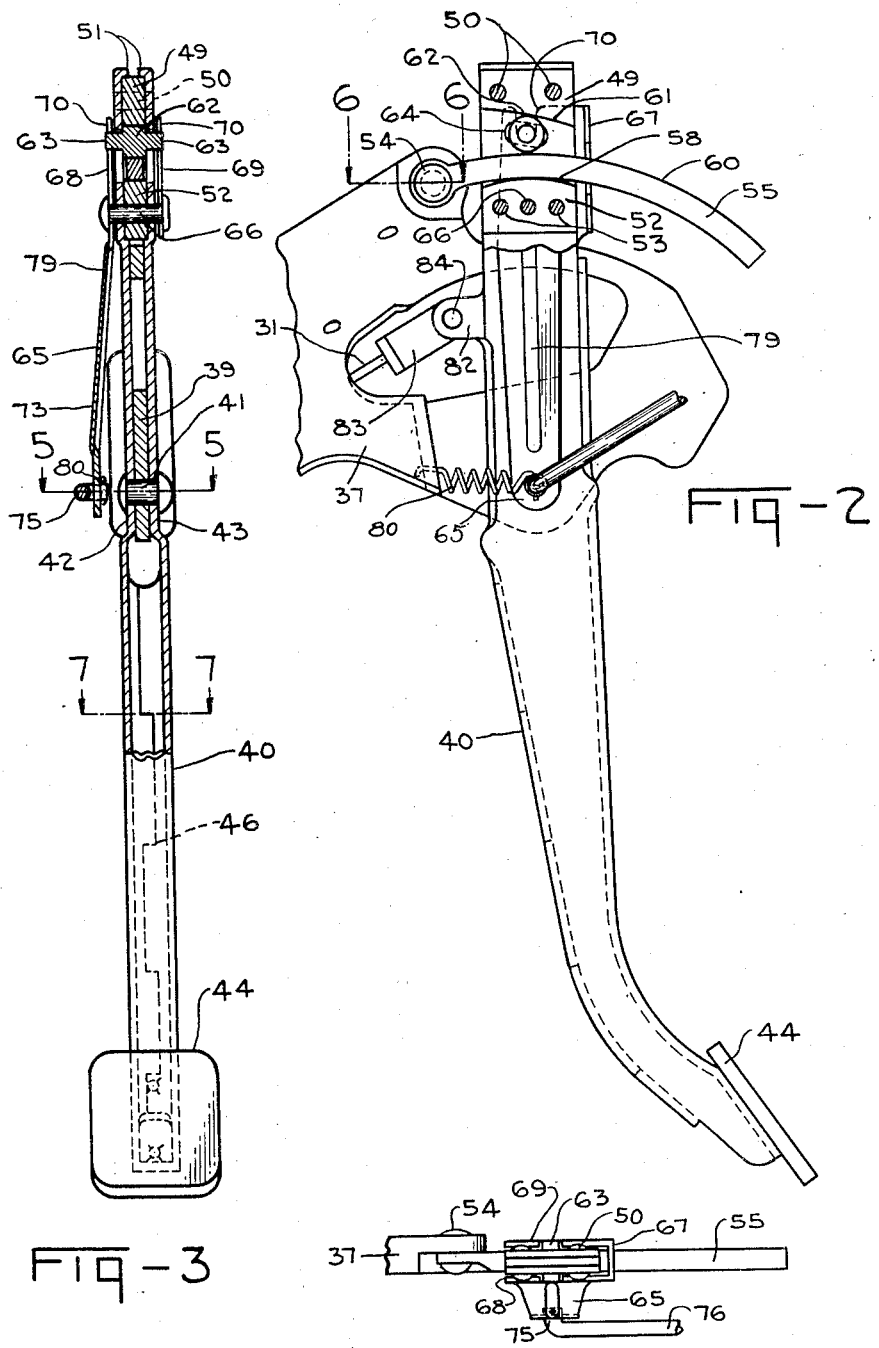

Patented Oct. 20, 1942

2,299,508

UNITED STATES PATENT OFFICE 2,299,508

MECHANISM CONTROL

Willard C. Skareen, Toledo, Ohio, assignor to The Bingham Stamping Company, Toledo, Ohio, a corporation of Ohio Application September 7, 1940, Serial No. 355,717

10 Claims. (Cl. 74—531)

This invention relates to a control mechanism or actuating apparatus, and more particularly to a mechanism and apparatus for actuating or controlling a braking system of an automotive vehicle.

The invention has for an object the provision of a lever arrangement embodying a friction clutching means of such nature that the mechanism may be positively retained in any position of adjustment and yet may be easily and quickly released with very little effort.

The invention is inclusive of a mechanism control including a lever and clutch arrangement of simple yet effective construction including foot manipulating means and clutch releasing means so arranged that the foot manipulating means may at all times be normally in a predetermined position when the brakes or mechanism actuated thereby is in released position.

A further object of the invention is the provision of a lever mechanism wherein the major parts are formed from sheet material thus effecting substantial reduction in the expense of manufacture and assembly and enhancing the uniformity and interchangeability of parts.

A further object of the invention resides in the provision of an emergency brake actuating pedal lever which depends from a point adjacent the instrument panel in which the lever retaining means comprises a locking means which may be released with the pedal lever in any position.

Further objects and advantages are within the scope of this invention such as relate to the arrangement, operation and function of the related elements of the structure, to various details of construction and to combinations of parts, elements per se, and to economies of manufacture and numerous other features as will be apparent from a consideration of the specification and drawings of a form of the invention, which may be preferred, in which:

Figure 2 is a side elevational view of the control mechanism of my invention;

Figure 3 is a front elevational view of the arrangement shown in Figure 2 with certain parts illustrated in section;

Figure 4 is a top plan view of the arrangement shown in Figure 2;

While I have shown the arrangement of the control mechanism of my invention as utilized for controlling the emergency brakes of an automotive vehicle, it is to be understood that I contemplate the use of my invention with any apparatus wherein the same may be found to have utility.

Figure 1:
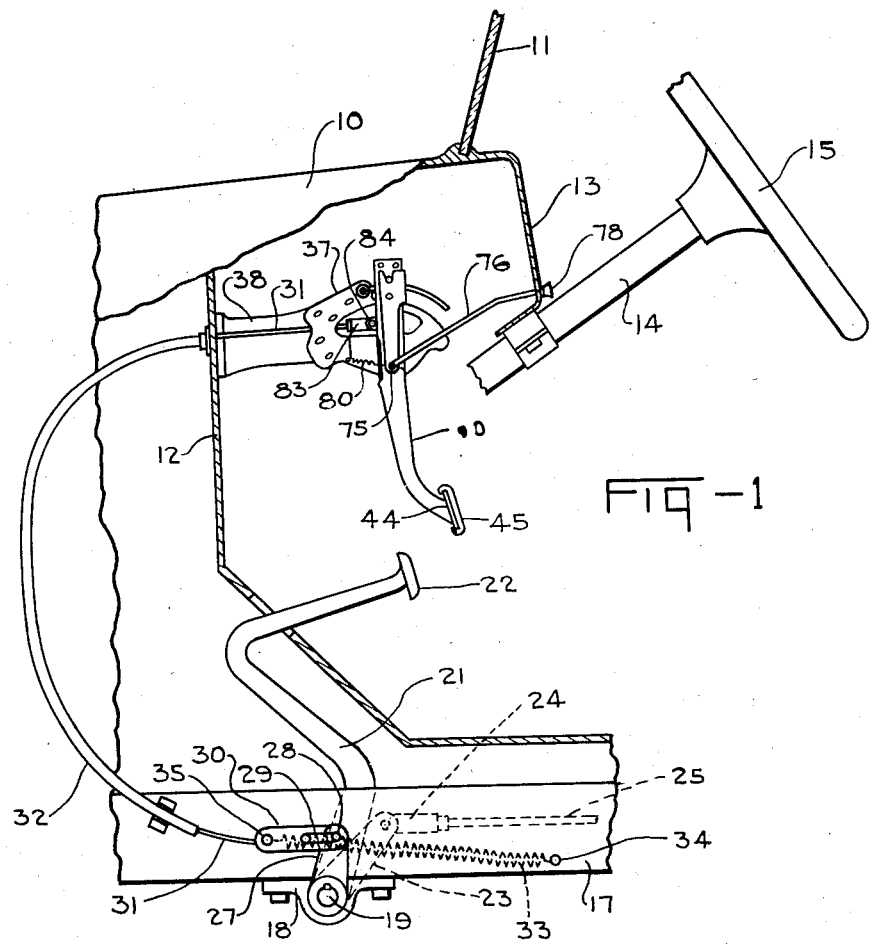
Figure 1 is a fragmentary elevational view, partly in section, showing a portion of the operator's compartment of the vehicle with the control mechanism of my invention embodied therein.
Figure 5:
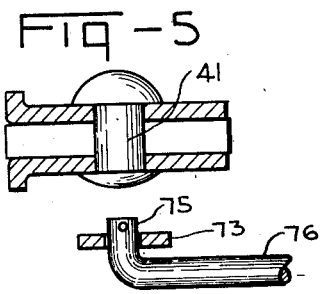
Figure 5 is a horizontal sectional view taken substantially on the line 5—5 of Figure 3.
Figure 7:
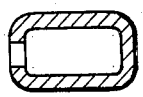
Figure 7 is a horizontal sectional view taken substantially on the line 7—7 of Figure 3.

Referring to the drawings in detail, and more especially to Figure 1 there is illustrated a portion of an operator's or driver's compartment of the vehicle wherein numeral 10 designates the cowl portion, 11 the windshield, 12 the dashboard of the vehicle, 13 the conventional instrument panel, a steering post 14 and a steering wheel 15. A portion of the vehicle chassis frame is illustrated as at 17, the same carrying a bracket 18 upon which is journalled a transversely extending shaft 19. Keyed or otherwise secured to the shaft 19 is a service brake pedal or member 21 having a foot pad actuating portion 22. Also keyed or otherwise secured to the shaft 19 is an arm 23 which is connected by means of a clevis 24 and a rod 25 to the brake mechanism of the vehicle (not shown). Secured to the shaft 19 is a second arm 27, having a pin 28 at its extremity which is received in a slot 29 of a member 30, the member 30 being secured at one end to the extremity of a flexible cable 31 which is carried within a suitable sheath or guide 32. A spring 33 has one end thereof secured as at 34 to the frame, the other end being secured as at 35 to member 30.

Figure 6:
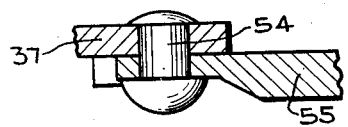
Figure 6 is a fragmentary detail sectional view taken substantially on the line 6—6 of Figure 2.

The arrangement of my invention is inclusive of a support or member 37, carried by a member 38, the latter being secured to the dashboard 12 or other suitable portion of the vehicle. The support 37 is preferably formed with a vertically positioned uniplanar portion 39 which pivotally supports a depending lever member 40 by a pin or rivet 41 passing through member 39 and through the side walls 42 and 43 of the lever member as particularly shown in Figure 3. The lever member has a depending body terminating in a foot pad portion 44 which may be covered by means of a rubber pad 45. The lever member is preferably made or formed of a single sheet of metal to the configuration illustrated in Figures 2 and 3 with the adjacent edges of the formed lever overlapping by the dove-tail formation indicated at 46, the joining edges of which may be spot welded if desired in order to enhance the strength of the body portion of the lever member. The upper extremity of the lever member is formed with parallel side walls 42 and 43 straddling the uniplanar portion 39 of the support. Positioned between the upper extremities of the side walls 42 and 43 is a block 49 which is secured to the side walls by means of rivets 50, the upper ends of the side walls of the lever being turned inwardly as at 51 to embrace the upper edge of the block 49. Spaced from block 49 and also secured between the side walls of the lever member is a second block 52 held in place by means of rivets 53. Pivotally secured to support 37 by means of a rivet or pin 54, as shown in Figures 2 and 6, is an arcuately shaped bar 55 which projects between the side walls 42 and 43 of the lever member. The upper edge surface 58 of block 52 is arcuately shaped but of a lesser radius than the radius of the arc of bar 55 as particularly illustrated in Figure 2.

Positioned between the upper arcuate clutch surface 60 of bar 55 and the lower arcuate clutch surface 61 of the block 49 is a clutch means or roller 62 having tenon portions 63 which extend through elongated slots 64 in the side walls 42 and 43 of the lever member. An actuating means for the clutch means or roller is provided in the form of a manipulating lever or arm 65 which is pivotally supported upon a pin or rivet 66 passing through block 52 and the side walls of the lever member, the lever 65 being formed of sheet metal and having a U-shaped portion 67 provided with side walls 68 and 69 which straddle the exterior walls of the lever member 40 adjacent the clutch roller 62. The side walls 68 and 69 are formed with open ended slots 70 which receive the extremities of tenons 63 of the clutch roller 62. The extremity 73 of the lever 65 is provided with an opening in which is received the transversely extending portion 75 of a rod 76, the latter projecting through an opening in a bracket 77 positioned adjacent the instrument panel 13. The other end of the rod 76 is provided with a manipulating means or button 78 for actuating the clutch releasing lever 65. The portion 73 of the lever member 65 is preferably reinforced by embossing the central portion thereof as indicated at 79.

With particular reference to Figure 2, it is to be noted that the arcuate lower edge 61 of the block 49 and the arcuate upper edge of bar 60 converge to form a wedging angle for cooperation with the clutch means or roller 62 for the purpose of maintaining the lever member 40 in "brake setting" position. A spring 80 having its ends respectively connected to the end of rod 76 and to the support 37 at all times tends to oscillate the clutch releasing lever 65 in a clockwise direction about its pivot pin 66 to urge the clutch roller 62 toward wedging engagement with the arcuate surfaces 61 and 60 of the block 49 and bar 55 respectively. The lever member 40 is provided with a projection 82 which is adapted to be straddled by a clevis 83 connected to member 82 by means of a pin 84, the clevis being secured to the upper extremity of the flexible brake actuating cable 31. It should be noted that the axis or fulcrum 41 of the lever member 40 is normally in alignment with the point of connection of the rod 76 with the clutch releasing lever 65 so that irrespective of the relative position of lever member 40, there is no relative change in the position of the point of connection of rod 76 with lever 65, so that the latter may be actuated at all times irrespective of the position of the brake actuating lever or pedal 40.

The operation of the device of my invention is as follows: As illustrated in Figure 1, the pedal lever 40 is in normal or brake released position. When it is desired to effect setting of the emergency brakes, the vehicle operator causes the lever to oscillate in a clockwise direction about the fulcrum or pin 41 by pressure upon the foot pad 45. As the pedal lever 40 is moved toward brake setting position, the clutch roller 62 does not restrain movement of lever 40, but when the lever is brought to brake setting position, the roller 62, under the influence of spring 80 acting through lever 65, is urged into wedging engagement between the surface 61 of the block 49 and surface 60 of the bar 55 and serves to hold the lever member 40 in brake setting position. The arrangement of pivotally supporting the bar 55 upon the support 37 compensates for inaccuracies in the manufacture of the surfaces 58 and 61 and also compensates for any wear of the clutch roller or clutch surfaces. To effect a release of the emergency brakes, the operator grasps the manipulating button 78 and by outward movement thereof away from the instrument panel 13 actuates rod 76 and actuates the releasing lever 65 in a counter-clockwise direction about its fulcrum pin 66. As the tenons 63 of the clutch roller 62 are carried in slots in side walls 68 and 69 of the releasing lever 65, movement of the lever 65 instantaneously causes the clutch roller to be moved out of wedging engagement with clutch surfaces 60 and 61, the tension of spring 33 acting upon the cable 31 serves to retract the pedal lever 40 to brake released position, and the spring 80 serves to move clutch actuating lever 65 to its normal position as indicated in Figures 1 and 2. It is to be noted that the pedal lever 40 may be released irrespective of its position as the rod 76 connects with the releasing lever 65 at the axis of the fulcrum 41 of the pedal lever so that during relative movements of the pedal lever the extremity of the releasing lever remains in relatively fixed position with respect to the fulcrum of the pedal lever.

It is apparent that, within the scope of the invention, modifications and different arrangements may be made other than is herein disclosed, and the present disclosure is illustrative merely, the invention comprehending all variations thereof.

What I claim is:

1. In combination, a lever member formed of sheet metal and of the first order of levers adapted to be fulcrumed to a suitable support and connected to the mechanism to be operated; a bar provided with a clutching surface; parallel projecting side wall portions straddling said bar integrally formed on said lever member; clutch means carried by said spaced parallel side walls including a clutch roller cooperatively associated therewith having interconnection with the clutching surface of said bar to hold said lever in a fixed position; an arm pivotally carried by said lever member and arranged to engage said clutch roller; and means connected to said arm substantially in alignment with the fulcrum of said lever member manually operable from a remote position to effect the release of said lever.

2. A brake control mechanism for vehicles including a combination, a support; a bar associated with said support; a lever member formed of sheet metal fulcrumed upon said support, said lever member having a hollow body portion with a foot pad at one end and its other end formed with side wall portions straddling said bar; a pair of abutments carried by the side wall portions of said lever member, one of said abutments arranged for engagement with said bar; a clutch roller arranged for contact with said bar and the second abutment; clutch releasing means connected to said lever member and arranged to engage said clutch roller; a manipulating rod connected to said clutch releasing means; and resilient means coacting with said clutch releasing means for normally urging said clutch roller into wedging engagement with said bar and said second abutment.

3. In combination, a relatively stationary support; an arcuately shaped member carried by said support; a foot operated element pivotally mounted on said support adapted to be connected to the mechanism to be actuated; one way clutching means carried by said foot operated element and having interconnection with said arcuately shaped member to retain the mechanism to be actuated in adjusted position; an arm pivotally mounted upon said foot operated element and having operative connection with said clutching means, and a manually operated rod pivotally connected to said arm for actuating the latter from a remote position with respect to the foot operated element for effecting a release of the clutching means.

4. A brake control mechanism for vehicles including in combination, a support; an arcuately shaped bar articulated with said support; a lever member formed of sheet metal and of the first order of levers fulcrumed upon said support; said lever having wall portions straddling said bar and carrying at one extremity a foot pad; a pair of abutments carried by said lever member, one of said abutments arranged for engagement with said bar; a clutch roller cooperatively associated with said lever member and arranged for contact with said bar and the second abutment; an arm pivotally connected to said lever member and arranged to engage said clutch roller; manipulating means connected to said arm at a point substantially in alignment with the fulcrum of said lever member; and resilient means associated with said arm for normally urging said clutch roller into wedging engagement with said bar and said second abutment to hold the lever in a predetermined position.

5. A brake control mechanism for vehicles including in combination, a lever member formed of sheet metal and of the first order of levers adapted to be fulcrumed upon a suitable support; a bar provided with a clutching surface; said lever member formed with a hollow body portion provided at one extremity with a foot pad and at its other extremity with wall portions straddling said bar; a pair of abutments carried by said lever member, one of said abutments arranged for engagement with said bar; a clutch roller cooperatively associated with said lever member and arranged for contact with the clutching surface of said bar and the second abutment; clutch releasing means arranged to engage said clutch roller; a rod connected to said clutch releasing means substantially in alignment with the fulcrum of said lever member; a manipulating handle secured to said rod; and resilient means normally urging said clutch roller into wedging engagement with said bar and said second abutment to hold the lever in a predetermined position.

6. A mechanism control comprising, in combination, a relatively stationary support; an arcuately shaped arm pivotally carried by said support; a foot operated lever element of the first order of levers pivotally mounted on said support adapted to be connected to the mechanism to be actuated; a block carried by said foot operated element having a curved surface adapted to engage the arcuately shaped arm; a clutch surface carried by said foot operated element; a roller clutch interposed between said clutch surface and said arm to lock said foot operated element in a fixed position; a pivoted member carried by said foot operated member connected to said roller clutch; and manually operated means connected to said pivoted member substantially in alignment with the fulcrum of said lever for releasing said foot operated lever element from its locked position.

7. A mechanism control comprising a support; a lever of the first order of levers fulcrumed upon said support and having a foot pad portion arranged beneath the said fulcrum; a clutch element carried by said lever for holding the lever in adjusted position; and releasing means associated with said clutch element including an arm pivotally mounted upon said lever; a manipulating rod having an articulated connection with said arm, said articulated connection being substantially in alignment with the fulcrum of said lever whereby said clutch element may be actuated to releasing position irrespective of the position of said lever.

8. A mechanism control; a support; a foot operated lever fulcrumed upon said support and having a foot pad portion at a depending extremity thereof; clutch means for holding said lever in adjusted position; clutch releasing means including a member pivotally supported on said lever; and manipulating means connected to said clutch releasing member substantially in alignment with the fulcrum of said lever whereby said clutch releasing means may be actuated irrespective of the position of said lever.

9. In a mechanism control; a support; an arcuately shaped bar articulated with said support; a lever member formed of sheet metal fulcrumed upon said support; said lever member having a hollow body portion; a foot pad portion secured to the depending extremity of said lever member, said lever member having at its upper end projecting side wall portions straddling said bar; a clutch roller cooperatively associated with said lever and arranged for contact with said arcuately shaped bar; a pair of abutments carried by said lever and arranged to be engaged by said clutch roller and said bar respectively; and means having connection with said clutch roller for effecting a release of said clutch roller.

10. In a mechanism control; a support; a bar articulated with said support; a lever member formed of sheet metal fulcrumed upon said support; a foot pad portion secured to the depending extremity of said lever member, said lever member having at its upper end projecting side wall portions straddling said bar; a clutch roller cooperatively associated with said lever and arranged for contact with said bar; a pair of abutments carried by said lever and arranged to be engaged by said clutch roller and said bar respectively; means having connection with said clutch roller for effecting a release of said clutch roller, said releasing means including an arm pivotally supported upon said lever member and having a projecting portion terminating adjacent the fulcrum of said lever member; and a manipulating rod connected to said releasing member at a point substantially in alignment with the fulcrum of said lever member.

WILLARD C. SKAREEN.